United States Patent [19]
Itoh

[11] 3,877,156
[45] Apr. 15, 1975

[54] NECK COMPONENT IN ANTHROPOMORPHIC TEST DUMMY

[76] Inventor: Kazu Itoh, 14-30, Sakuragaoka 4-chome, Setagaya-ku, Tokyo-to, Japan

[22] Filed: Apr. 29, 1974

[21] Appl. No.: 465,019

[30] Foreign Application Priority Data
Mar. 2, 1974 Japan................. 49-24772

[52] U.S. Cl. .................................................. 35/17
[51] Int. Cl. .......................................... G09b 23/32
[58] Field of Search........................... 35/17; 46/173

[56] References Cited
UNITED STATES PATENTS

| | | | |
|---|---|---|---|
| 3,707,782 | 1/1973 | Alderson | 35/17 |
| 3,740,871 | 6/1973 | Berton | 35/17 |
| 3,753,301 | 8/1973 | Daniel | 35/17 |
| 3,762,069 | 10/1973 | Culver | 35/17 |

*Primary Examiner*—Harland S. Skogquist
*Attorney, Agent, or Firm*—Ladas, Parry, Von Gehr, Goldsmith & Deschamps

[57] ABSTRACT

The main structure of the neck component of a test dummy simulating a human body is a synthetic rubber cylinder connected to the head and upper thorax of the dummy and having a slit in the front upper part thereof and a cavity in the lower central part thereof whereby the neck component deflects asymmetrically in forward and rearward tilting of the head and neck due to crash impact forces thereby to simulate closely the behavior of the human neck under the same impact forces. For refinement of this simulative characteristic, prestressed tension members may be stretched on the left and right sides of the main structure between the upper and lower ends thereof.

8 Claims, 8 Drawing Figures

FIG. 5
FIG. 6
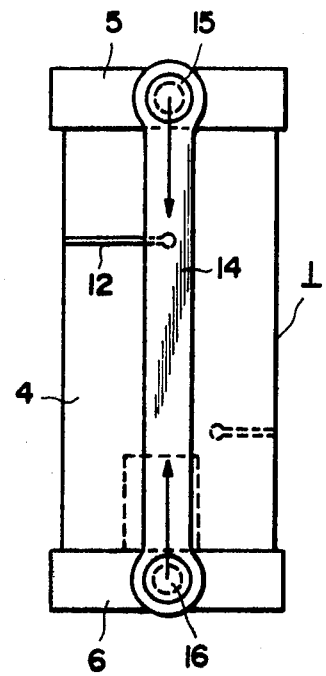
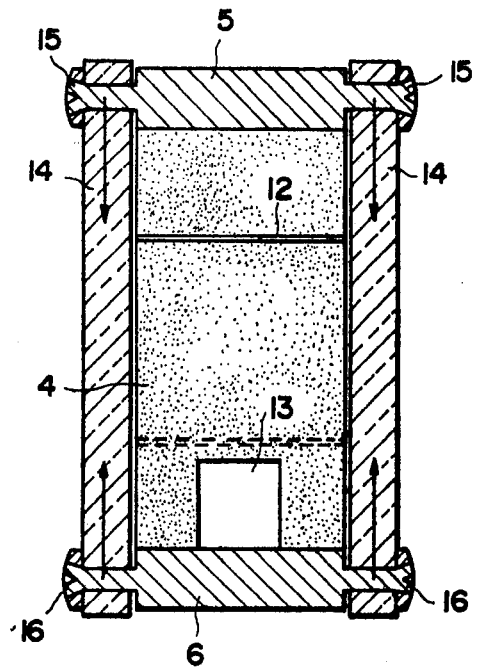
FIG. 7
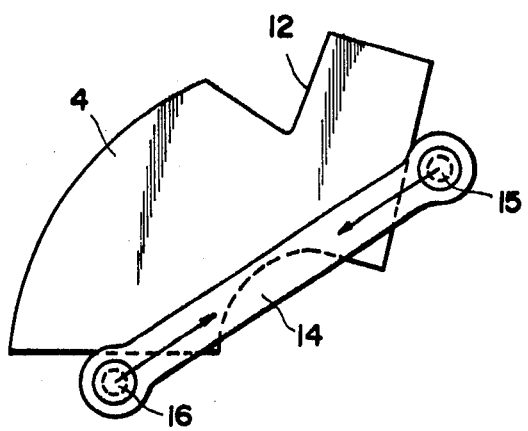

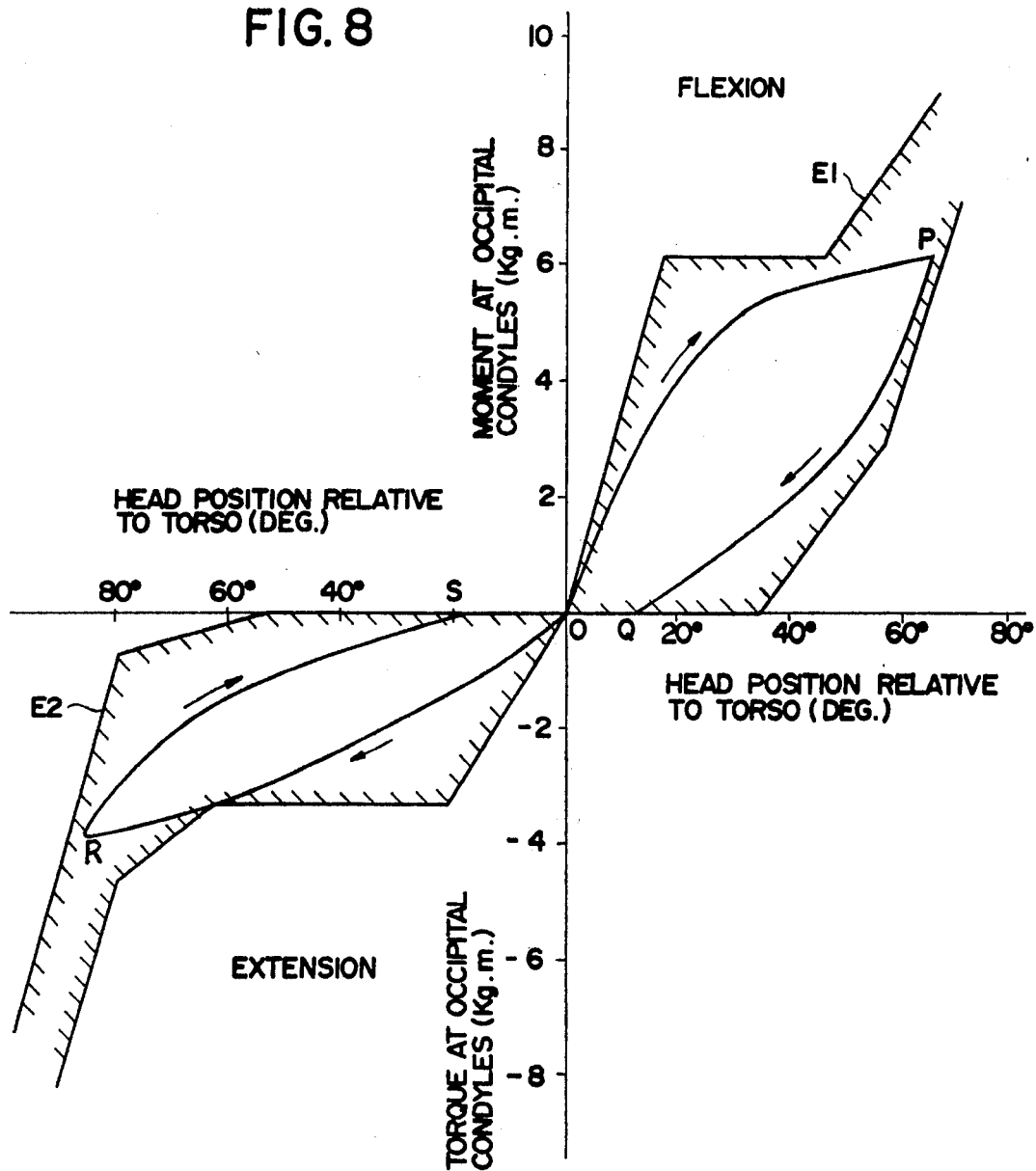

NECK COMPONENT IN ANTHROPOMORPHIC TEST DUMMY

BACKGROUND OF THE INVENTION

This invention relates generally to anthropomorphic structures or artificial structures mechanically simulating the human body and more particularly to anthropomorphic test dummies suitable for use in various experiments and tests such as the measurements according to authoritative standards of the behaviors of vehicles and their occupants in crashes.

More specifically, this invention relates to a new and advanced neck part in an anthropomorphic test dummy (hereinafter referred to as a dummy) which neck part has a deformational behavior in forward inclination (flexion) and rearward inclination (extension) very closely simulating that of a living human neck at the time of a crash.

In general, it is desirable that a dummy for crash experiments such as those of motor vehicles simulate both statically and dynamically standard values relating to all parts of the human body, and that the characteristics of these parts in the dummy be excellent. In view of this requirement, great care is exercised in the fabrication of a dummy so that it will simulate as closely as possible actually measured values relating to the shapes, dimensions, weights, and centers of gravity of the various parts of the human body, the relative movements of these parts, and like features and characteristics. These measured values have been obtained from tests on living subjects (volunteers) and cadavers as set forth hereinafter.

Of the various parts of a human body, the head and neck are the most vulnerable and most subject to serious injury in a crash. Of the various parts constituting a dummy, the neck assembly is the most easily damaged in an actual collision and, at the same time, is the most difficult to fabricate to simulate the neck of a live human body.

Heretofore, there have been a number of types of dummy neck construction, which may be broadly divided into mechanical necks having a number of artificial vertebrae in jointed assembly, neck structures made of rubber-like materials such as rubber and high-polymer material such as polyurethane resin (ordinarily of cylindrical shape), and necks of structures which are mixtures of the first two types.

Of these types, the neck having mechanical vertebrae in jointed assembly simulates closely the living human neck with respect to relative angles, but noise of higher harmonics becomes admixed at the instant of collision with the output of an electrical accelerometer installed in the dummy head component at the center of gravity thereof and disturbs the measured value or measurand of the accelerometer. This is a serious drawback.

While a neck component having a cylindrical main structure made of a rubber-like material as mentioned above has inherent damping (internal hysteresis or hysteresis damping) to some extent and, in this respect, simulates the human neck, which has inherent damping as will be apparent hereinafter, a dummy neck of this character deforms symmetrically in flexion and extension and therefore does not simulate a human neck, which deforms asymmetrically in these directions. These characteristics and inadequacies of conventional dummy neck structures of this character will be described more fully hereinafter with respect to results of actual measurements. From these results, it will be obvious that, when tests are repeatedly carried out with the use of a dummy having neck characteristics differing from those of a human neck, accurate and definite measured values applicable to the human body cannot be obtained.

While the human neck is free to undergo bending to the left and right and twisting to the left and right, in addition to the above mentioned flexion and extension, as well as combinations of these movements, only the flexion and extension are asymmetrical. Moreover, almost all crash tests are concerned with impact forces in the front-to-rear or rear-to-front directions which give rise to flexion and extension deformations of the neck.

SUMMARY OF THE INVENTION

Accordingly, it is an object of the present invention to provide a neck component in a dummy for crash experiments in which neck component the simulative characteristic is improved by bringing the state of deformation of the dummy neck resulting from the flexion and extension movements of the dummy head and neck at the time of a collision into substantial coincidence with that of a human neck as determined from tests on living subjects and cadavers as described hereinafter.

Another object of the invention is to provide in a dummy a neck component which meets the requirements of authorative standards such as Part 572- Anthropomorphic Test Dummy, Motor Vehicle safety Standard No. 208, Occupant Crash Protection of the National Highway Traffic Safety Administration, Department of Transportation, Washington, D.C., U.S.A.

A related object of the invention is to provide a neck component of excellent simulative characteristics in dummies for use in testing projects such as the "U.S.-Japan Research Cooperation Project on NHTSA Testing of Itoh Seiki Crash Dummies" of the Office of Crashworthiness, NHTSA/N41-42, Department of Transportation, Washington, D.C., U.S.A.

Still another object of the invention is to provide a dummy neck component of the above stated characteristic which is of simple construction and relatively low manufacturing cost.

The foregoing objects and other objects as will be apparent hereinafter have been achieved by the present invention according to which in one aspect thereof, briefly summarized, there is provided a neck component in an anthropomorphic test dummy having a head component and an upper thorax component, which neck component comprises a neck main structure made of a resilient material with inherent hysteresis damping characteristic and connected at its superior and inferior ends to the head and upper thorax components, respectively, of the test dummy, the neck main structure having in an anterior part thereof a slit whereby the neck component in flexion and extension deformations due to impact accelerations closely simulates the human neck.

According to the present invention in a modification thereof, there is provided a neck component of the above described character in which the neck main structure further has a cavity whereby the inherent hysteresis damping factor of the structure is increased to further simulate that of the human neck.

According to the present invention in a further modification thereof, there is provided a neck component as described above which is further provided with pretensioned tension members disposed on the left and right sides of the neck main structure and connected at their superior and inferior ends respectively to the superior and inferior ends of the neck main structure thereby to further improve the simulative characteristic of the neck component which thereby more closely simulates the human neck in flexion extension deformations due to impact accelerations.

The nature, principles, and utility of this invention will be more clearly apparent from the following detailed description when read in conjunction with the accompanying drawings throughout which like parts are designated by like reference numerals and characters.

BRIEF DESCRIPTION OF THE DRAWINGS

In the drawings:

FIG. 5 is a left-side elevation showing an example of a neck component modified by the provision of elastic side members according to this invention;

FIG. 6 is a front elevation, with a part in vertical section, of the neck component shown in FIG. 5;

FIG. 7 is a left-side elevation of the neck component illustrated in FIGS. 5 and 6 in a state of extension; and FIG. 8 is graph similar to FIGS. 2 and 4 indicating the simulative characteristic of the modified neck component illustrated in FIGS. 5, 6 and 7.

DETAILED DESCRIPTION

As conducive to a full understanding of the novelty and utility of this invention, a brief description of the nature of the movements of the human head and neck in flexion and extension and the simulative characteristic of a conventional neck component with respect to these movements will first be presented.

Figure 1:
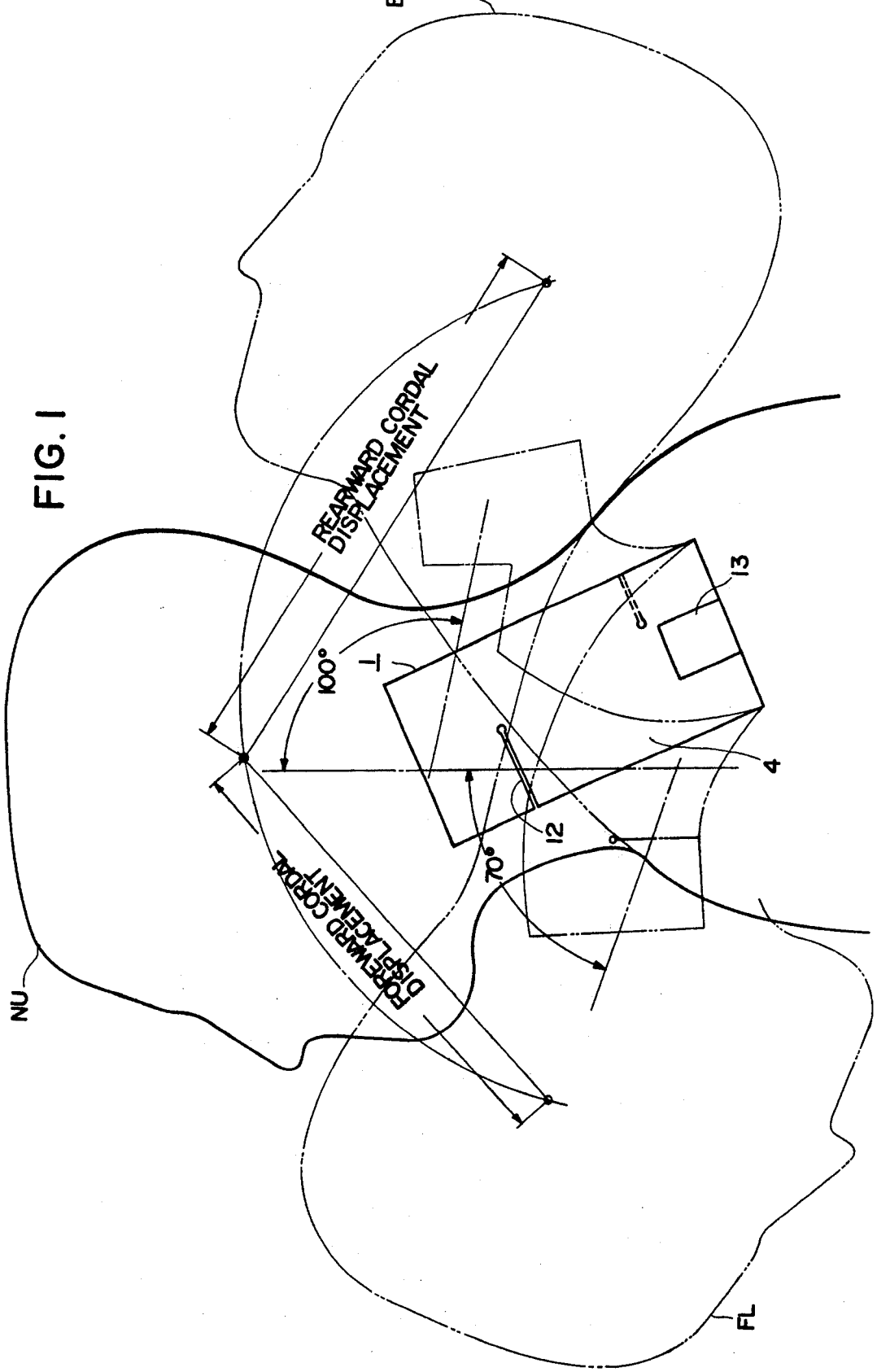
FIG. 1 is a left-side elevation, in outline form, indicating the states of the human head and neck relative to the thorax respectively in the normal upright position (full-line outline), in extreme forward-tilt (flexion) position, and in extreme rearward-tilt (extension) position, (flexion and extension positions being indicated by chain-line outline), deformations corresponding to these states of an example of a neck main structure according to this invention being also shown.

These movements are indicated in FIG. 1, in which outline NU in full line shows the normal upright position of the head and neck. Outline FL in chain line shows the extreme flexion position with the chin pressed against the chest, which the head and neck would assume in a head-on collision. Outline EX in chain line shows the extreme extension position, which the head and neck would assume in a rear collision causing a whip-lash impact. It is to be observed that the flexion and extension deformations of the neck are not symmetrical. That is, in flexion the neck deflects principally in the lower portion thereof, while in extension it deflects principally in the upper portion thereof. The response of the neck in crashes producing these deformations is also asymmetrical as will be apparent from the following description.

Figure 2:
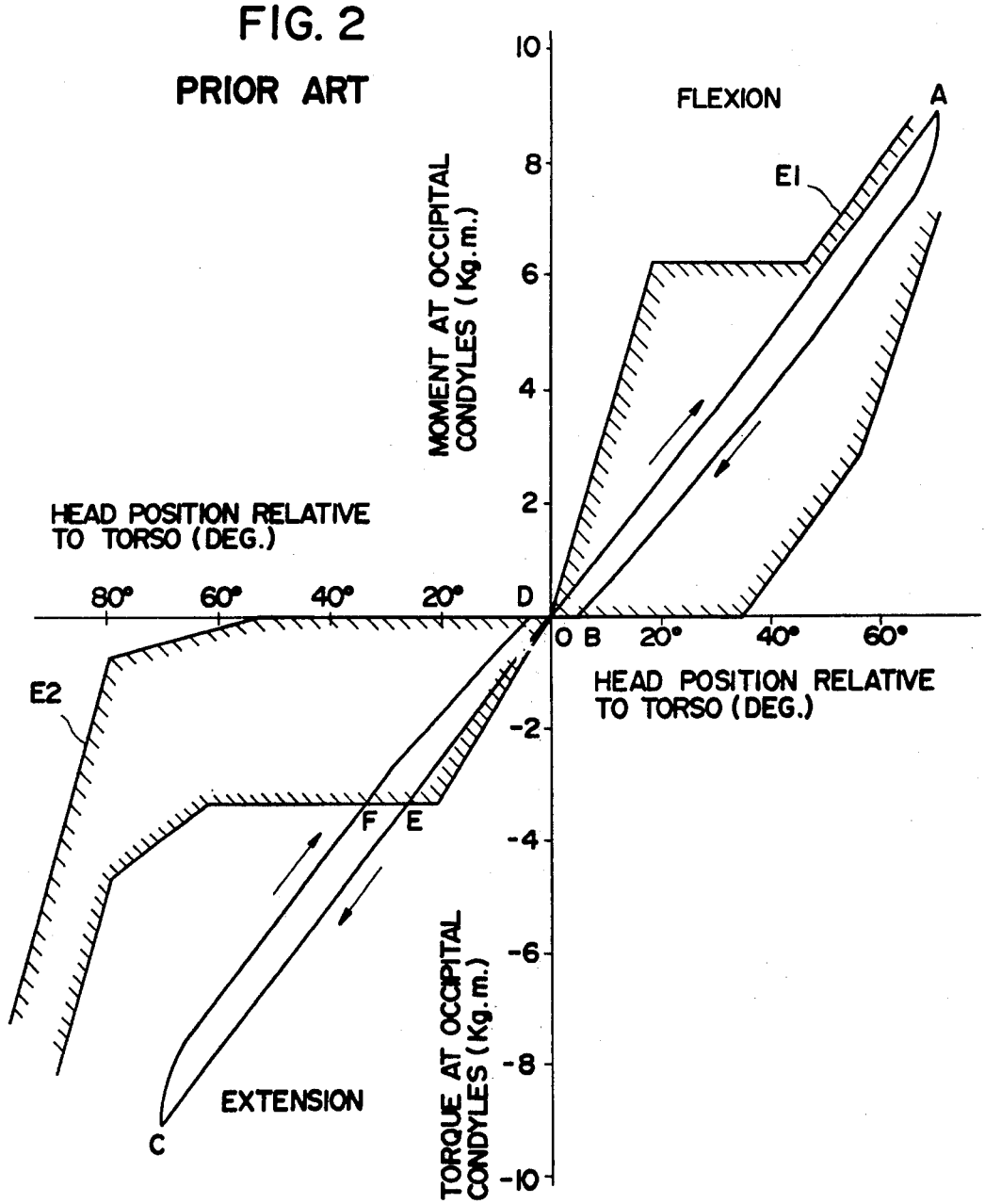
FIG. 2 is a graph indicating the simulative characteristic of a dummy neck component of known construction.
Figure 4:
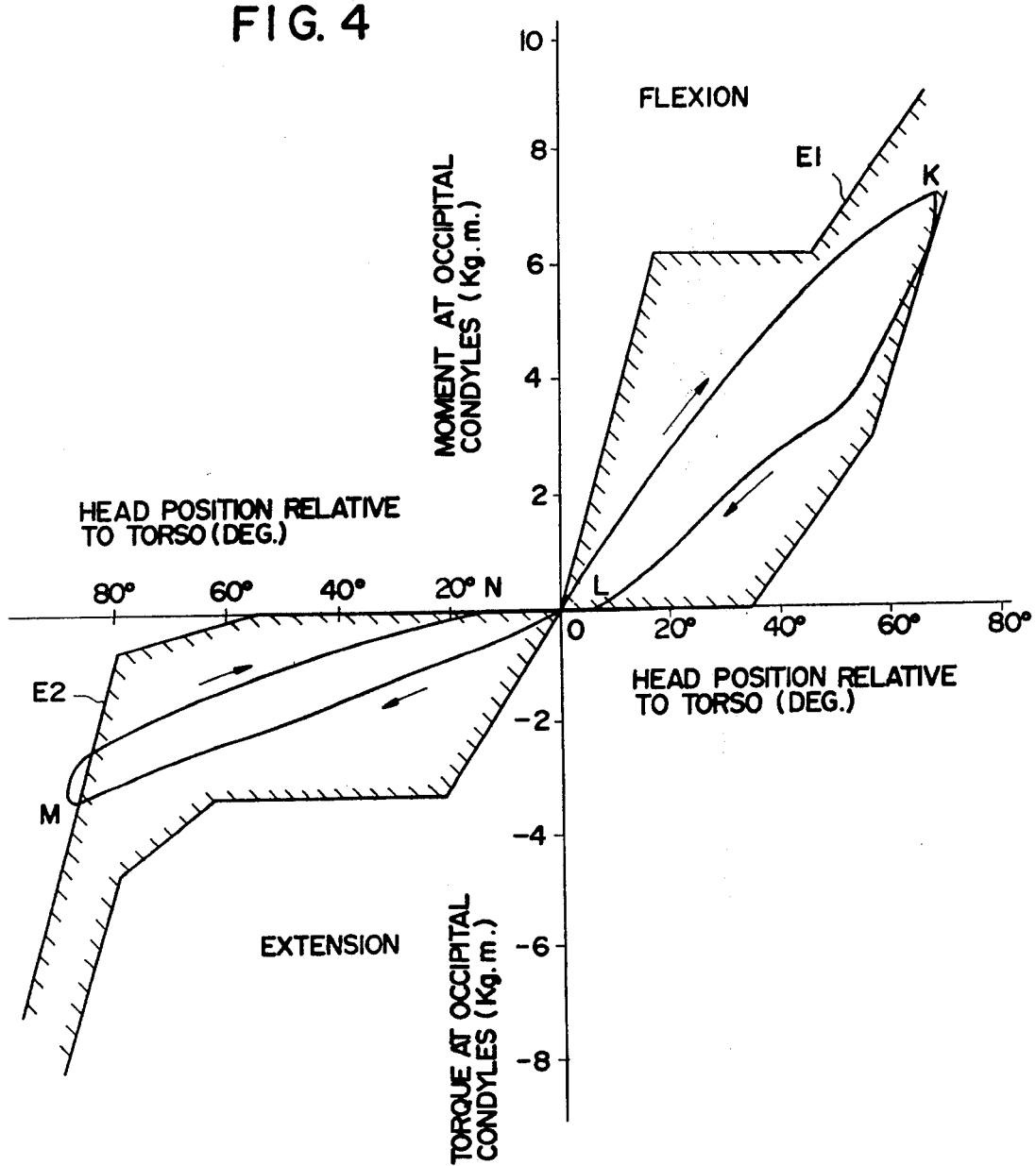
FIG. 4 is a graph similar to FIG. 2 indicating the simulative characteristic of the neck component illustrated in FIG. 3.

These movements of the head and neck of the human body and of dummies may be represented quantitatively by torque-rotation graphs as illustrated in FIGS. 2, 4 and 8. In each of these graphs, the ordinate represents torque or moment (kg.m) acting on the neck, and the abscissa represents the head position (degrees of angle) relative to the torso. In each of these graphs, envelope E1 is a head-neck response envelope for flexion, and envelope E2 is "recommended extension response envelope," both adapted from data disclosed by H.J. Mertz and L.M. Patrick, "Strength and Response of the Human Neck," Proceedings of the Fifteenth Stapp Car Crash Conference, paper 710855, New York, Society of Automotive Enginneers, Inc. These envelopes are based on data obtained from a series of tests performed with the use of a living volunteer and a number of cadavers.

When the results of test carried out under the same conditions with a dummy provided with a neck component having a main structure made of a high-polymer material of known structure are plotted on the same graph as indicated in FIG. 2, a closed loop O-A-B is formed for flexion, which loop is found to be substantially enclosed within the envelope E1. On the other hand, however, a closed loop O-C-D is formed for extension, which loop departs at a part E-C-F thereof from the enveloped region E2. From this result, it is obvious that the neck component of conventional design, while simulating a human neck in flexion, cannot simulate a human neck in extension in the higher torque region.

Figure 3:
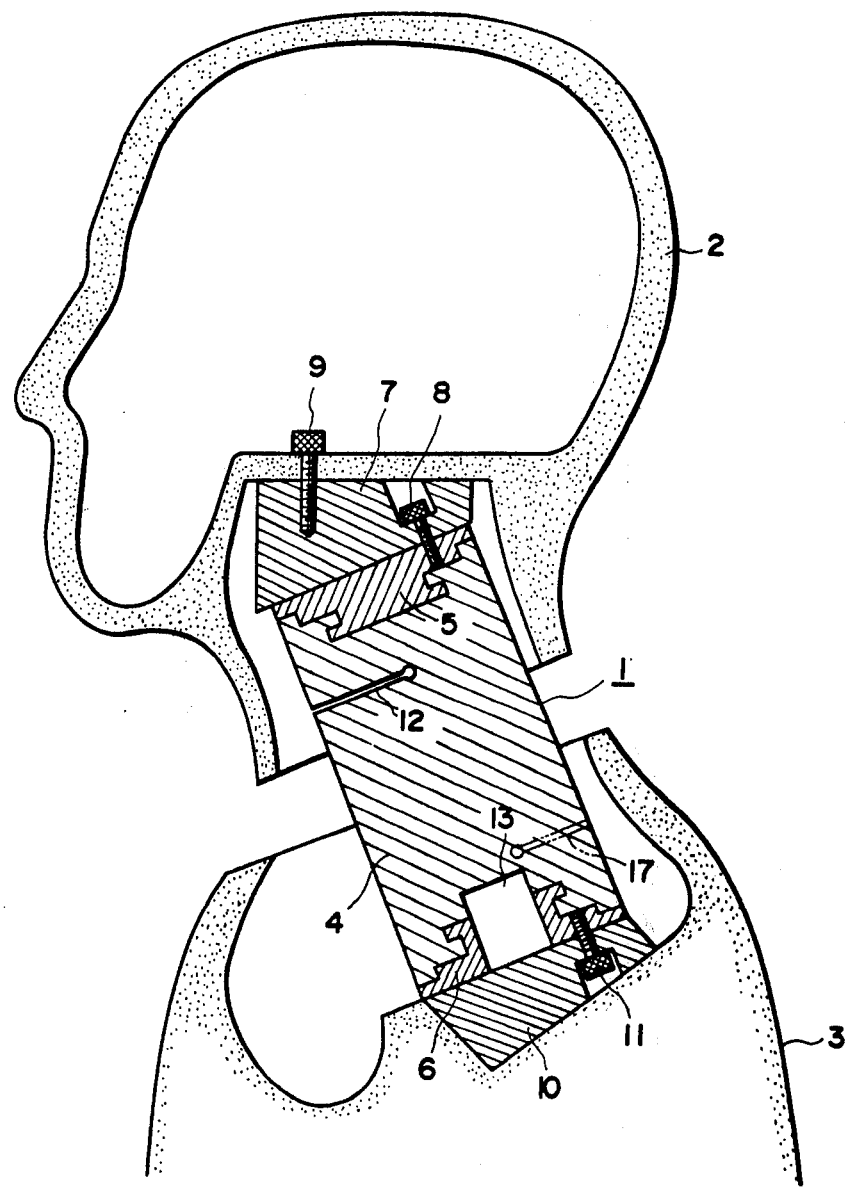
FIG. 3 is a left-side elevation, in vertical section, showing the essential construction of one example of a dummy neck assembly according to this invention in assembled state relative to the head component and upper thorax component of the dummy.

In one example of a dummy neck component according to this invention as illustrated in FIG. 3, the neck component 1 joins head component 2 to an upper thorax component 3. The main structure 4 of this neck component 1 has the shape of cylindrical column made of a highly resilient material having an appreciable damping factor as, for example, a high-polymer material such as a synthetic rubber. This main structure 4 is provided at its upper or superior end and its lower or inferior end with attachment fittings 5 and 6, respectively, imbeddedly fixed thereto at the time of molding of the structure 4.

A head setting angle adjusting block 7 is secured to the attachment fitting 5 with bolts 8, and the head component 2 is secured to this block 7 with bolts 9. A neck setting angle adjusting block 10 is secured to the attachment fitting 6 by bolts 11 and is secured also to the upper torso 3 by means not shown. By appropriately adjusting setting angles with these adjusting blocks 7 and 10, the head component 2 can be mounted with correct attitude on and relative to the upper thorax component 3 to form a combined structure closely simulating the corresponding upper part of a human body.

The most important feature of this invention is the provision of a slit 12 in the neck main structure 4 on the anterior or front side thereof. In the example illustrated in FIG. 3, this slit is at a position nearer to the upper end of the structure 4 than the lower end thereof, and the depth of this slit is substantially equal to one half of the diameter of the structure 4.

By the provision of the slit 12, the neck component is caused to deflect in extension principally at the upper part thereof as indicated in FIG. 1, the slit 12 being opened into a gaping shape. In the normal upright state of the head and neck components, the slit is closed. In flexion, the neck component deflects forward. The slit 12 during this flexion is closed and has little effect on the deflection of the neck main structure 4, which thereby deflects forward with substantially the same curvature over its entire length as though there were no slit. That is, the main structure 4 deflects in flexion at a relatively lower part thereof than in extension.

Thus, the mechanisms of the neck structure 4 in flexion and extension are made asymmetrical and closely simulate those of the human neck as indicated in FIG. 4. At the same time, the distances through which the center of gravity of the head component 2 shifts (cordal lengths or displacements) in flexion and extension can be adjusted to simulate those of the human head by appropriately selecting the constants relating to the neck structure 4 and the slit 12.

Another important feature of the invention is the provision of a cavity 13 formed at the lower or inferior end part of the neck main structure 4. I have found that the provision of this cavity 13 has the effect of increasing the inherent hysteresis damping factor of the main structure 4.

The simulative characteristic of one example of the neck component of the above described construction according to the invention as determined by actual measurement is indicated by a closed hysteresis loop O-K-L for flexion and a closed hysteresis loop O-M-N for extension in FIG. 4, the coordinates of which are the same as those of FIG. 2. As is apparent from this graph in FIG. 4, the two response loops for flexion and extension both lie almost completely within the head-neck response envelopes E1 and E2 proposed in the aforementioned reference by Mertz and Patrick.

The simulative characteristic thus indicated is a great improvement over that of the known neck component indicated in FIG. 2. The improvement particularly in extension is undoubtedly due to the provision of the above described slit 12. It is to be observed also that these loops are "fatter" or broader than those of the known neck component indicated in FIG. 2, indicating an increase in the inherent hysteresis damping factor apparently due to the cavity 13 as mentioned above. These loops are observed to coincide very closely with those obtained as a result of tests on a volunteer and a number of cadavers and disclosed in the aforementioned reference by Mertz and Patrick.

Another example of the dummy neck component, which is a modification and a refinement of the above described example, will now be described with reference to FIGS. 5 through 8, in which parts that are the same as or equivalent to corresponding parts in FIG. 3 are designated by like reference numerals.

This modified neck component is provided with rubber tension members 14, 14 on the left and right sides of the neck main structure 4. These tension members 14, 14 are anchored at their upper ends to trunnion-like pins 15, 15 extending outward from the peripheral part of the upper attachment fitting 5 on the left and right sides thereof and at their lower ends to similar trunnion-like pins 16, 16 extending outward from the peripheral part of the attachment fitting 6 on the left and right sides thereof.

These tension members 14, 14 are prestressed, that is, are under appropriate tension at the time of assemble. These tension member may be made of suitable metal tension springs instead of rubber.

In other respects, this dummy neck component is the same in construction and assembly as that of the preceding example illustrated in FIG. 3. The simulative characteristic of this modified neck compoenent of the above described construction is as indicated by one example in FIG. 8, in which it is to be observed that the response loops O-P-Q and O-R-S in the motions of flexion and extension can be placed completely within the neck response envelopes E1 and E2. This highly desirable simulative characteristic may be considered to be a result of the returning force of the tension members 14, 14 acting at the time of extension in a direction to cause the neck main structure 4 to deflect into a curved shape as indicated in FIG. 7.

In cases where it is desired to cause the neck main structure 4 to deflect still more readily at its lower part in flexion, an additional slit 17, as indicated by chain line in FIG. 3, may be formed in the lower posterior part of the neck main structure. In flexion this slit 17 will open and facilitate deflection of the neck main structure at its lower part. In extension, this slit 17 will close and have almost no influence on the deflection of the structure toward the rear.

In one example of a neck component which was fabricated and tested, the neck main structure 4 was of 135-mm. length and 75-mm. diameter and was made of a synthetic rubber of a hardness of 70, and an anterior slit 12 of a depth of 37-mm. was formed 40-mm. from the superior end of the main structure. A cavity 13 of a diameter of 45-mm. and a depth of 55-mm. was formed at the inferior end of the main structure coaxially therewith. These details are set forth merely for the purpose of illustration and are not intended to be restrictive.

The only limitations to the dimensions and shape of the neck structure, the manner of attachment of this structure to the head component and the upper thorax component, and other particulars of the neck component are that the entire neck component assembly be fully accommodated within the neck part of the dummy, this neck part simulating the human neck in shape, dimensions, and properties of its surfaced part, and that the neck component closely simulate the human neck under static and dynamic tests.

What is claimed is:

1. In an anthropomorphic test dummy having a head component and an upper thorax component, the combination therewith of a neck component comprising a neck main structure made of a resilient material with inherent hysteresis damping characteristic and connected at a superior end thereof to the head component and at an inferior end thereof to the upper thorax component, the neck main structure having in an anterior part thereof a slit whereby the neck component in flexion and extension deformations due to impact accelerations closely simulates the human neck.

2. The combination as claimed in claim 1 in which the neck main structure has a cavity whereby the inherent hysteresis damping factor of the neck main structure is increased.

3. The combination as claimed in claim 2 in which the slit is closer to the superior end than to the inferior end of the neck main structure, and the cavity is at the inferior end of the neck main structure.

4. The combination as claimed in claim 3 in which the resilient material is a synthetic rubber.

5. The combination as claimed in claim 3 in which a second slit is provided in a posterior part of the neck main structure closer to the inferior end thereof than to the superior end thereof.

6. The combination as claimed in claim 3 in which the neck component further comprises prestressed tension members disposed on the left and right sides of the neck main structure and connected to the superior and inferior end parts of the neck main structure, the tension members functioning to improve the simulative characteristic of the neck component of simulating the human neck in deformations due to impact accelerations.

7. The combination as claimed in claim 3 in which attachment fittings are fixed respectively to the superior and inferior ends of the neck main structure and are secured respectively to a head setting angle adjusting block and a neck setting angle adjusting block, which are respectively secured to the head and upper torso components.

8. The combination as claimed in claim 6 in which attachment fittings are fixed respectively to the superior and inferior ends of the neck main structure for attachment respectively to the head and upper torso components and are provided on the left and right sides thereof with members to which the tension members are connected.

* * * * *